United States Patent
Pandey et al.

(10) Patent No.: US 7,283,587 B2
(45) Date of Patent: Oct. 16, 2007

(54) DISTORTION MEASUREMENT

(75) Inventors: Awadh B. Pandey, Karnataka (IN); Tej P. Rai, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 10/739,748

(22) Filed: Dec. 18, 2003

(65) Prior Publication Data

US 2005/0137826 A1 Jun. 23, 2005

(51) Int. Cl.
H04B 1/66 (2006.01)
G01P 11/00 (2006.01)

(52) U.S. Cl. .................................. 375/240; 702/149

(58) Field of Classification Search ............. 375/240; 702/149; 382/173; 348/420.1
See application file for complete search history.

(56) References Cited

U.S. PATENT DOCUMENTS

| 4,845,559 | A | * | 7/1989 | Labit et al. ............ 375/240.22 |
| 5,068,723 | A | * | 11/1991 | Dixit et al. .............. 348/420.1 |
| 6,337,881 | B1 | | 1/2002 | Chaddha |
| 6,389,389 | B1 | | 5/2002 | Meunier et al. |
| 6,430,317 | B1 | | 8/2002 | Krishnamurthy et al. |
| 6,434,196 | B1 | | 8/2002 | Sethuraman et al. |
| 6,480,822 | B2 | | 11/2002 | Thyssen |
| 2001/0022815 | A1 | * | 9/2001 | Agarwal ................. 375/240.16 |
| 2006/0110038 | A1 | * | 5/2006 | Knee et al. ................... 382/173 |

FOREIGN PATENT DOCUMENTS

| WO | WO 02/25858 A1 | 3/2002 |
| WO | WO 02/052388 A2 | 7/2002 |
| WO | WO 03/021907 A1 | 3/2003 |

OTHER PUBLICATIONS

Bourlard, Hervé and Morgan, Nelson, "Hybrid HMM/ANN Systems for Speech Recognition: Overview and New Research Directions", Bernhard Froetschl, Thu Jan. 8 23:41:22 MET 1998, [Retrieved from Internet: URL: http://www-agki.tzi.de/ik98/prog/kursunterlagen/t2/bourlard.html 40pgs.

Prof. Tsuhan Chen, "Multimedia Communications: Coding, Systems, and Networking", 18-796/Spring 1999/Chen, H.263, H.263v2, and H.26L. 28 pgs.

* cited by examiner

*Primary Examiner*—Mohammed Ghayour
*Assistant Examiner*—Lawrence Williams
(74) *Attorney, Agent, or Firm*—Buckley, Maschoff & Talwalkar LLC

(57) ABSTRACT

A method, apparatus, and system for measuring a distance between two points that includes measuring a distance intermediate a first data point and a second data point in each of two dimensions and adding the absolute values of those measured distances.

24 Claims, 4 Drawing Sheets

Network

DISTORTION MEASUREMENT

BACKGROUND

Audio and/or video compression is often performed to efficiently transmit audio and/or video signals over networks such as the Internet. Because of the limited resources of networks such as the Internet, such compression may reduce the amount of those resources required to transmit a portion of video and/or audio over the network and may reduce the amount of time required to transmit the portion of video and/or audio over the network, but may also cause distortion in the transmission.

BRIEF DESCRIPTION OF THE DRAWINGS

The accompanying drawings, wherein like reference numerals are employed to designate like components, are included to provide a further understanding of distortion measurement, are incorporated in and constitute a part of this specification, and illustrate embodiments of distance measurement that together with the description serve to explain the principles of distortion measurement.

In the drawings.

DETAILED DESCRIPTION

Figure 1:
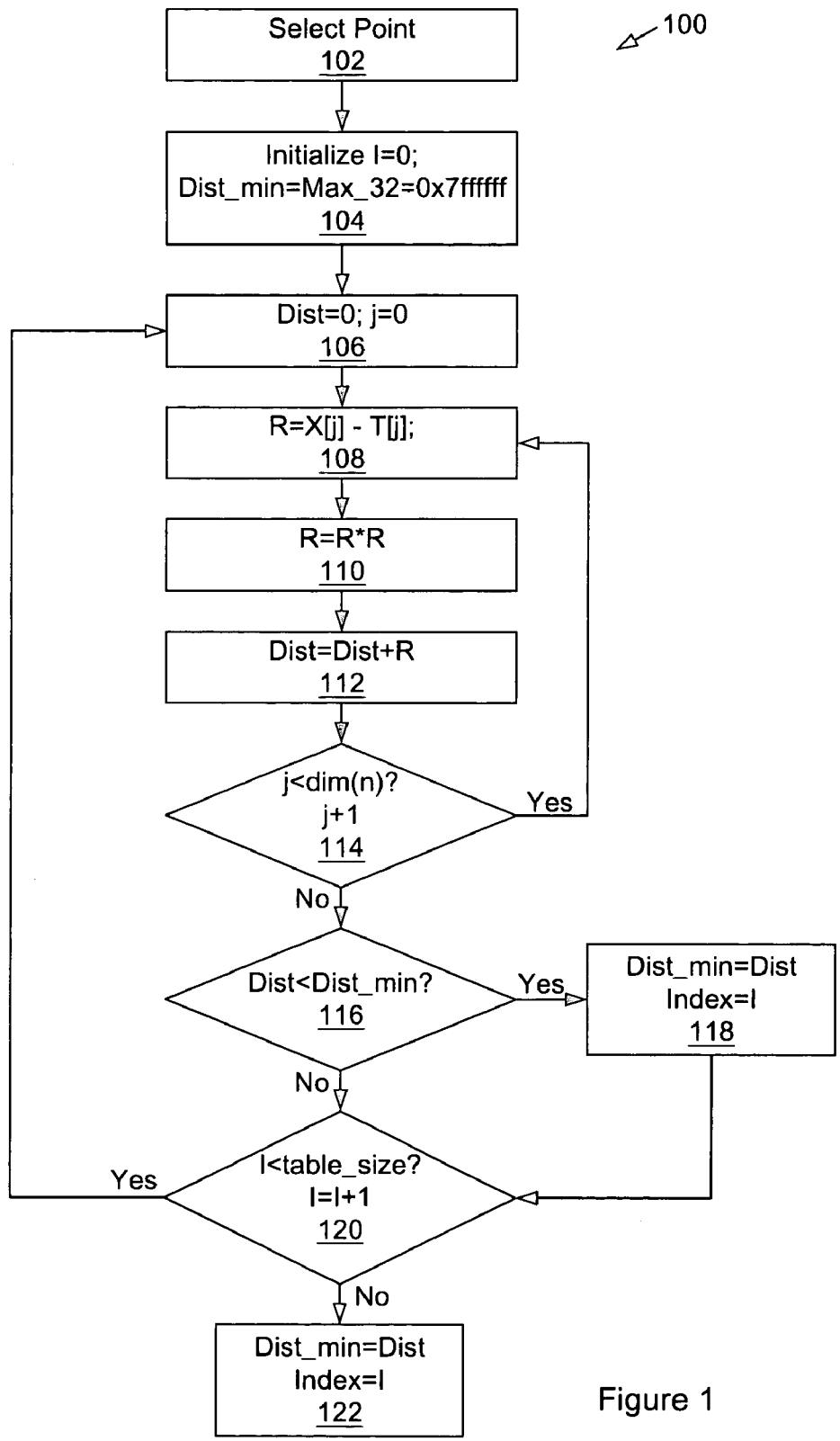
FIG. 1 illustrates an embodiment of a method for finding a minimum distance between a subject point and each of a plurality of points in a table, finding a table point that is closest to the subject point, and identifying an index of that closest table point, wherein the distance is calculated using the L2-norm.

Reference will now be made to embodiments of distance measurement between data points and selection of an index of a closest data point, examples of which are illustrated in the accompanying drawings. Moreover, those of ordinary skill in distance and distortion measuring will appreciate that the distance measuring described in connection with audio and video compression may be equally applicable to other technologies in which distance measuring between points is applicable. Other details, features, and advantages of distance measuring will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification are not necessarily all referring to the same embodiment. References to "or" are furthermore intended as inclusive so "or" may indicate one or another of the ored terms or more than one ored term.

Determining a distance between two points and identifying an index of a particular point is a component of various data manipulation methods and devices including audio and/or video compression. For example, searching a table of points in multiple dimensions to find a point that is closest to a desired point and identifying the index of that closest table point may be an element of MPEG compression or decompression and other forms of video or audio compression or decompression, and may, in particular be used in decompression to find signal distortion or a point that may be played or displayed that is closest to a decompressed data point.

Some standards for compressing and storing full motion video, and sometimes audio, are associated with "MPEG," which stands for Moving Pictures Experts Group. For example, an MPEG2 protocol is defined by International Organization for Standardization (ISO)/International Engineering Consortium (IEC) document number 13818-1 entitled "Information Technology—Generic Coding of Moving Pictures and Associated Audio Information" (2000) and an MPEG4 protocol is defined by ISO/IEC document number 14496-1 entitled "Information Technology—Coding of Audio-Visual Objects" (2001).

A goal of the MPEG standards is to make the storage and transmission of programming more efficient by compressing the data that defines the visual and, in certain standards, audio presentation or programming. MPEG compression techniques deal with 'frame-based' video. Frame based video compression interacts with the subject programming at the video frame level and, where applicable, with the audio associated with each of those frames. MPEG2 generally uses fewer techniques than MPEG4 to compress the programming data stream. For example, MPEG2 may compress only the video portion of the programming, while MPEG4 may compress both video and audio portions of the programming.

FIG. 1 illustrates an embodiment of a method for finding a minimum distance intermediate a first or subject point and each of a plurality of points in a table, selecting a table point that is closest to the subject point, and identifying an index of that closest table point, wherein the distance is calculated using vector quantization and the L2-norm 100. The subject point may, for example, be compressed data corresponding to a signal that is received at a node on a network and is described in multiple dimensions, commonly two to nine dimensions. The table may include points that, for example in multi-media communications, may represent audio or video information that may be played or displayed by the receiving node, and that may be arranged in a suitable multi-dimensional array. The table points may furthermore be described in the same number of dimensions as the subject point. An index that represents a location in the table of a table point that is closest to the subject point may then be retained to identify that closest table point. That point may then be played or displayed in place of the received point or the distance between the subject point and the closest table point may be used to compensate for distortion present in the compressed data.

Vector quantization may use various distortion measures such as, for example, Mahanalobi's distortion measurement techniques, covariance weighted distortion measurement techniques, and Euclidian distortion measurement techniques. Those distortion measurement techniques, furthermore, may also utilize what is commonly referred to as an L2-norm. The L2-norm may be used to find the shortest distance between two points in multi-dimensional space. That distance may furthermore correspond to distortion that may be present in compressed audio or video. The L2-norm may be represented by the equation:

$$D_2(A, B) = \sum_{i=1}^{n} ((a_1 - b_1)^2 + (a_2 - b_2)^2 + (a_3 - b_3)^2 + \ldots + (a_n - b_n)^2)$$

wherein:

A and B are points of data in multiple dimensions;

$D_2$ is the distance between points A and B using the L2-norm;

n is the number of dimensions in the space being measured; and a and b are positions of points A and B respectively in each dimension.

Thus, utilizing the L2-norm, the minimum distance between two points A and B is equal to the sum of the square of the difference between the locations of those points in each dimension defining those points. Moreover, the table data point that is nearest the received data point may be used for estimation purposes by, for example, a codec or in wireless speech receipt to minimize error. The received data point, referred to as X in FIG. 1, may alternately or in addition be associated with a size and location of a pixel of a display at a transmitting node and the table data point may be associated with a size and location of a nearest pixel of a display at a receiving node so that display data may be displayed at the pixel at the receiving node that most closely corresponds to the pixel at the transmitting node.

The subject point of data is selected or received at a node. That subject point of data will be represented by the variable "X" and have coordinates $x_1, x_2, \ldots x_n$, where "n" is the number of dimensions of the variable "X." That subject point of data, X, exists in multiple dimensions and may represent audio and/or video received by an audio and/or video receiving node at 102. At 104, a table index place keeper, which may be represented by the variable "I," is initialized by setting it equal to zero and a minimum distance "dist_min" is set to a maximum value that may be held in, for example, a byte or word having a set of bits to be used in the distance calculation. In the example illustrated in FIG. 1, the set of bits used in the distance calculation will include 32-bits.

106 to 120 is an indexing loop in which a minimum distance from X to a point in the table is calculated each iteration of the loop. Distance, which may be represented by the variable "Dist," is initialized to zero at 106 and a dimension place keeper that increments through the various dimensions of the data point X and the table entries, which may be represented by the variable "j," is initialized to 0.

At 108-114, a distance accumulation loop operates to accumulate distance segments from the data point X to a particular table data point on a dimension by dimension basis at the rate of one dimension per cycle of the loop. Thus, in a first cycle a distance segment, referred to as "R," is set equal to a distance from the location of a first dimensional element of the data point X to the location of the first dimensional element of the table data point under consideration. At 110, the distance segment R is squared and at 112 the square of the distance segment R is added to the distance variable Dist. At 114, the dimension place keeper j is incremented until j becomes equal to the number of dimensions of the data points in the table.

If j is less than the number of dimensions in data point X and the data points in the table, then the loop from 108 to 114 is performed again with j incremented to find a distance from the data point X to the table data point in each dimension. Once j becomes equal to the number of dimensions in the data points, the distance accumulation loop 108-114 is exited because all dimensions of the data points have then been measured (noting that the first dimension was measured when j was equal to 0, so the last dimension was measured when j was equal to the number of dimensions existing minus 1).

At 116, a determination is made as to whether Dist is less than Dist_min. It should be noted that Dist_min was set equal to the maximum value that may be held in the set of bits utilized to hold a value for Dist_min at 104, so that the subject point in the table would normally have a distance to the data point X that is less than Dist_min as initialized. If the distance from X to the current table data point is less than Dist_min, then Dist_min is set to Dist and the current index point I is retained, for example, in a variable "Index" at 118. The process then proceeds to 120. If Dist is not less than Dist_min at 116, then the process proceeds directly to 120. In that way, as each additional point in the table is considered, the distance from each of those points to X will be compared to the distance between the table data point closest to X thus far in the search and X. Moreover, the shortest distance encountered between points in the table and X, which may correspond to signal distortion caused by compression of the signal or other factors, will be retained in Dist_min, while the index value of the closest table data point associated with that shortest distance is retained in Index. In that way, once all table data points have been considered, the index of the table data point that is closest to X will be known, as well as the distance between those points.

At 120, table index place keeper I is incremented until I is equal to the table size and the distance from the data point X to each other table data point is calculated by repeating 106-120. When I becomes equal to the number of data points in the table, indicating that the method for finding a minimum distance between a subject point and each of a plurality of points in a table, finding a table point that is closest to the subject point, and identifying an index of that closest table point, wherein the distance is calculated using vector quantization and the L2-norm 100 has measured the distance between the data point X and every entry in the table, the method 100 terminates for that data point X at 122, providing the distance between X and the closest table data point and a value representing the index of that closest table data point in the table. The method 100 may then be repeated for other data points X.

Figure 2:
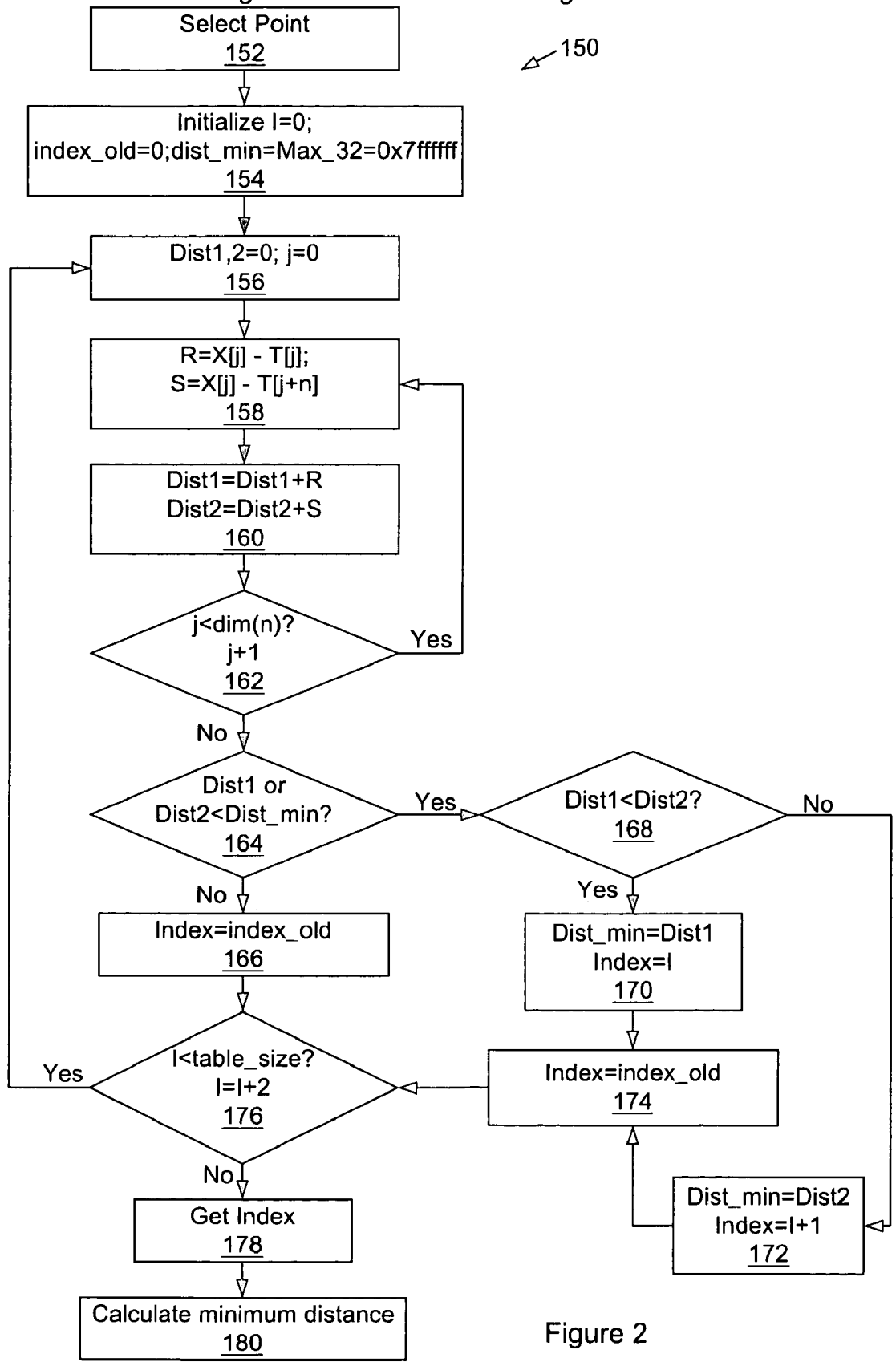
FIG. 2 illustrates an embodiment of a method for finding a minimum distance between a subject point and each of a plurality of points in a table, finding a table point that is closest to the subject point, and identifying an index of that closest table point, wherein the distance is calculated using the L1-norm.

FIG. 2 illustrates an embodiment of a method for finding a minimum distance between a subject point and each of a plurality of points in a table, finding a table point that is closest to the subject point, and identifying an index of that closest table point, wherein the distance is calculated using the L1-norm 150. The L1-norm may also be used to find the shortest distance between two points in multi-dimensional space, which may furthermore correspond to distortion that may be present in compressed audio or video. Thus, the L1-norm may replace the L2-norm in calculating the minimum distance between two points and does so in FIG. 2 as compared to FIG. 1. The L1-norm may be represented by the equation:

$$D_1(A, B) = \sum_{i=1}^{n} (|a_1 - b_1| + |a_2 - b_2| + |a_3 - b_3| + \ldots + |a_n - b_n|)$$

wherein:

A and B are points of data in multiple dimensions;

$D_1$ is the distance between points A and B using the L1-norm;

n is the number of dimensions in the space being measured; and a and b are positions of points A and B respectively in each dimension.

It may be seen from the equations for the L1-norm and the L2-norm that the L1-norm is computationally less complex than the L2-norm as, for example, it requires no multiplication, and therefore will generally require less processing time and power than the L2-norm. It has also been shown through experimentation using a standardized speech codec that distortion or distance measurement plays a significant role in the complexity of processing audio communications and that finding a match with respect to an element entry in a table, such as a quantization table, may be performed with good accuracy and less complexity, using the L1-norm. Thus, by using the L1-norm rather than the L2-norm to compute the minimum distance between two points in multi-dimensional space to find a match in a table, less computational power is required and accurate measurement and selection is maintained at a good level.

A first or subject point of data, which may be represented by the variable "X" and have coordinates $x_1, x_2, \ldots x_n$, where "n" is the number of dimensions of the variable "X," may be selected when, for example, that data point is received by an audio and/or video receiving node at 152. At 154, a table index place keeper, represented by "I," is initialized by setting it equal to zero, a table index old place keeper, which may be represented by a variable such as "index_old" is initialized to zero, and a minimum distance "dist_min" is set to a maximum value that may be held in a set of bits to be used in the distance calculation, again in this example, 32 bits. The table index keeper, I, in this embodiment will be set to the location of a first table data point to be considered in the method 150 such that a second table data point to be considered in the method 150 may be represented by I+1.

At 156 to 176, is an indexing loop in which a minimum distance from X to a point in the table is calculated during each iteration of the indexing loop. A first distance, which may be represented by the variable "Dist1," and a second distance, which may be represented by the variable "Dist2," are initialized to zero at 156 and a dimension place keeper that increments through the various dimensions of the data point X and the table entries, represented by the variable "j," is initialized to 0. Two distances, Dist1 and Dist2 are used in the embodiment illustrating use of the L1-norm because two data points from the table may be compared to the data point X in each iteration of the indexing loop 156-176 in that embodiment to improve efficiency of the search for the closest table point. It should be noted that one or more than two table data points may be considered in the indexing loop 156-176 if so desired.

At 158-162, a distance accumulation loop operates to accumulate distance segments from the data point X on a dimension by dimension basis for each of the two table data points being considered, R and S, at the rate of one dimension for each of those two data table points per cycle of the loop. Thus, in a first cycle at 158, a first distance segment, R, is set equal to the distance from an element in a first dimension, j, of X to a corresponding element of the first table data point currently being considered, R, by subtracting the table data element at that dimension, represented by T[j] from the element for data point X at the corresponding dimension, represented by X[j], and taking the absolute value of that difference. Also in the first cycle at 158, a second distance segment, S, is set equal to the distance from the element in the first dimension, j, of X to a corresponding element of the second table data point currently being considered, S, by subtracting the element at that dimension of S, represented by T[j+n] from the element X at the corresponding dimension, represented by X[j], and taking the absolute value of that difference. By adding the number of dimensions of the data points, n, to the current dimension place keeper, j, the dimension of the element of the data point in the table that follows the current data point and that corresponds to the dimension of data point X that is under consideration may be identified.

At 160, in the first cycle through the distance accumulation loop 158-162, a first distance segment, Dist1, is set equal to a distance from the location of the first dimensional element of the data point X to the location of the first dimensional element of the first table data point under consideration, R, by adding R to Dist1, which was initialized to zero at 156, and a second distance segment, Dist2, is set equal to a distance from the location of the first dimensional element of the data point X to the location of the first dimensional element of the second table data point under consideration, S, by adding S to Dist2 which was initialized to zero at 156. Thereafter, at 160, Dist1 is set equal to Dist1+R and Dist2 is set equal to Dist2+S, thereby adding the distances between X and R in each dimension and the distances between X and S in each dimension without necessitating the multiplication utilized in the method utilizing the L1-norm 100. At 162, the dimension place keeper j is incremented until j becomes equal to the number of dimensions of the data points in the table.

If j is less than the number of dimensions of the data points in the table, then the distance accumulation loop 158-162 is performed again with j incremented to find a distance from the data point X to the two table data points R and S in each dimension. Once j becomes equal to the number of dimensions in the data points, the distance accumulation loop 158-162 is exited because all dimensions of the data points have then been measured.

At 164, a determination is made as to whether the first table data point under consideration, Dist1 is less than Dist_min, indicating that first table data point is nearer to the data point X than any previous table data point or whether the second table data point under consideration, Dist2 is less than Dist_min, indicating that second table data point is nearer to the data point X than any previous table data point. If neither Dist1 nor Dist2 is less than Dist_min, then the previous nearest index point is retained at 166. If, however, either or both of Dist1 and Dist2 are smaller than Dist_min, it indicates that at least one of points R and S is closer to X than any previously considered point.

Therefore, at 168, a determination is made as to whether Dist1 is less than Dist2. If Dist1 is less than Dist2 then Dist_min is assigned the value of Dist1 and Index is assigned the value that corresponds to the index position of R, which is the value of I, at 170. If Dist1 is not less than Dist2 then Dist_min is assigned the value of Dist2 and Index is assigned the value that corresponds to the index position of S, which is the value of I+1, at 172. Index_old is then assigned the value of index at 174.

At 176, I is incremented by two, because the method 150 calculates distance to two table data points each iteration, as long as I is less than the total number of data points in the table, which may be represented by a variable "table_size." If I is less than the total number of data points in the table, then the distance from the data point X to the next two points in the data table are calculated by returning to 156. If only one point remains to be compared in the table, then the distance to R may be calculated and no distance to S maybe calculated. If I is not less than the total number of data points in the table, then index, which corresponds to the table data point that is nearest to X, is read at 178 and the distance from that nearest table data point to X is calculated at 180. That distance from the nearest table data point to the data point X may be calculated by, for example, the following equation that utilizes squaring:

$$\text{Dist\_min} = \sum_{j=0}^{n-1} (X[j] - T[\text{Index}*n + j])^2$$

wherein:

T is the closest table point as determined by operation of 152-178;

Dist_min is the distance between X and T; and n is the number of dimensions in the space being measured.

It may be noted, however, that even where squaring is used in the final calculation of distance, squaring use was avoided in the method 150 utilizing the L1-norm for distance calculations to every other point in the table.

In that equation, j is again used as a dimension place keeper and "Index*n+j" locates the elements of T in the table that correspond to the various dimensions of X. The equation thus sums the distance between each dimensional element of data points X and T and squares that sum.

The table of points may be, for example, a stochastic codebook, an adaptive codebook, or an algebraic codebook and may contain, for example, audio pitches or pixel locations. A stochastic codebook may include points to be looked-up. An adaptive codebook may contain excitation vectors derived from input filter states, wherein a lag value, or an integer value associated with a location in the table, may be used as an index for the adaptive codebook. An algebraic codebook may furthermore be used to populate the excitation vectors. For example, a signal that carries the excitation may include a string of nonzero pulses with predefined interlaced sets of potential positions. The amplitudes and positions of the pulses can then be derived from a rule requiring minimal or no physical storage space to contain the table.

Once the closest point in the table is discovered, a signal may be produced that corresponds to that closest point or to the distortion present, which may be indicated by the difference between the nearest point and the data point X. The signal may also correspond to other information such as the subject point X. Thus, for example, where the data point X is received at a local node from a remote node, the difference between the nearest point and the data point X may indicate distortion existing in data point X and a signal may be output at the local node that compensates for that distortion. That distortion may, furthermore, correspond to distortion in, for example, an audio pitch created through compression and decompression of a transmitted audio pitch signal.

Figure 3:
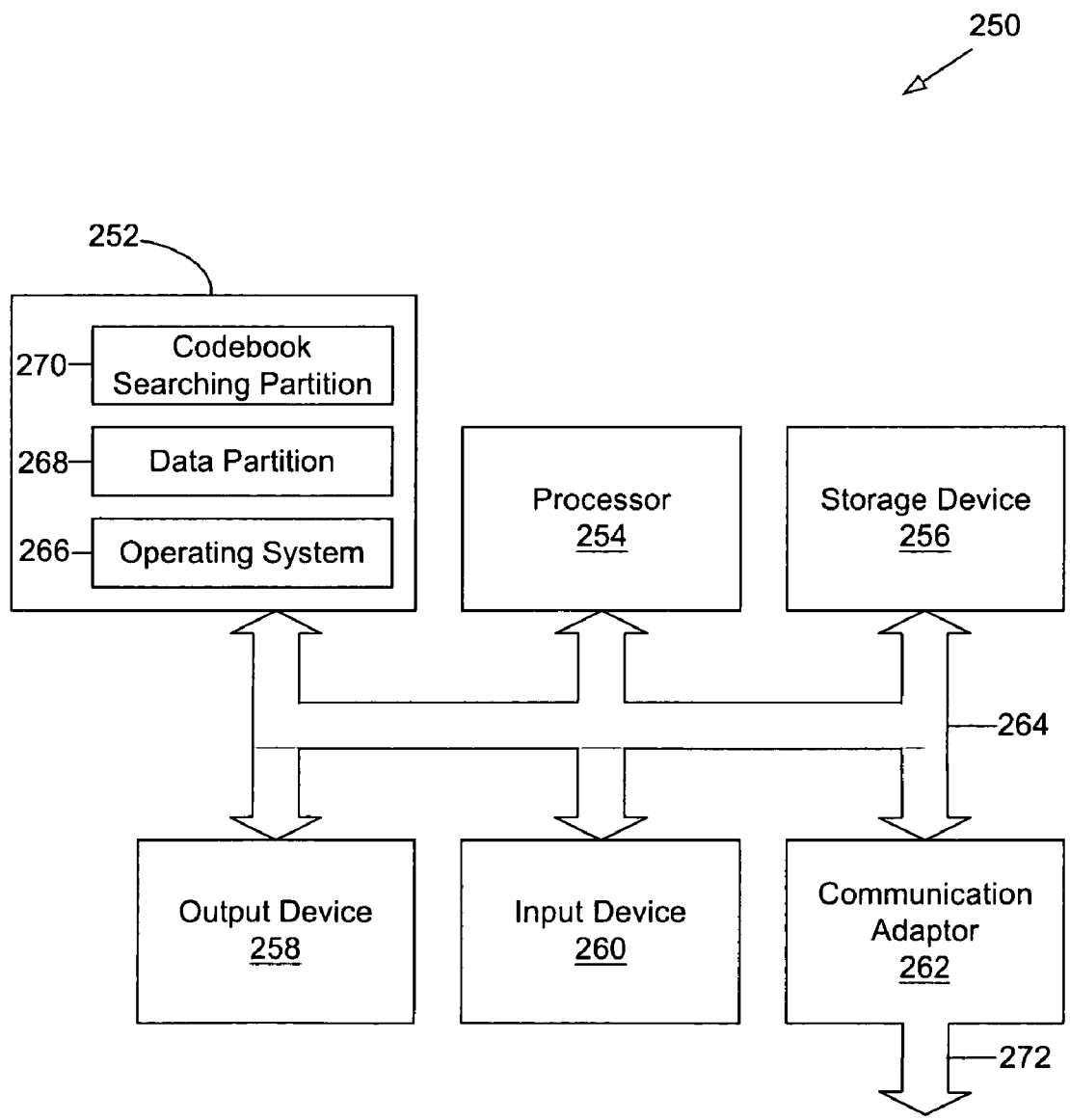
FIG. 3 illustrates an embodiment of a data receiving device that may determine distortion and provide a signal compensated for that distortion.

FIG. 3 illustrates an embodiment of a data receiving device 250 that may interpret signals received utilizing the L1-norm. That data receiving device 250 includes memory 252, a processor 254, a storage device 256, an output device 258, an input device 260, and a communication adaptor 262. It should be recognized that any or all of the components 252-262 of the data receiving device 250 may be implemented in a single machine. For example, the memory 252 and processor 254 might be combined in a state machine or other hardware based logic machine.

Communication between the processor 254, the storage device 256, the output device 258, the input device 260, and the communication adaptor 262 may be accomplished by way of one or more communication busses 264. It should be recognized that the data receiving device 250 may have fewer components or more components than shown in FIG. 3.

The memory 252 may, for example, include random access memory (RAM), dynamic RAM, and/or read only memory (ROM) (e.g., programmable ROM, erasable programmable ROM, or electronically erasable programmable ROM) and may store computer program instructions and information. The memory 252 may furthermore be partitioned into sections including an operating system partition 266, wherein instructions may be stored, a data partition 268 in which data may be stored, and a codebook searching partition 270 in which instructions for distance measuring and searching a codebook for a closest point and stored information related to such measuring and searching may be stored. The codebook searching partition 270 may also allow execution by the processor 254 of the instructions to perform the instructions stored in the codebook searching partition 270. The data partition 268 may furthermore store data to be used during the execution of the program instructions such as, for example, a table and audio or video information that is being formatted for or retrieved from one or more packets.

The processor 254 may execute the program instructions and process the data stored in the memory 252. In one embodiment, the instructions are stored in memory 252 in a compressed and/or encrypted format. As used herein the phrase, "executed by a processor" is intended to encompass instructions stored in a compressed and/or encrypted format, as well as instructions that may be compiled or installed by an installer before being executed by the processor.

The storage device 256 may, for example, be a magnetic disk (e.g., floppy disk and hard drive), optical disk (e.g., CD-ROM) or any other device or signal that can store digital information. The communication adaptor 262 may permit communication between the data receiving device 250 and other devices or nodes coupled to the communication adaptor 262 at a communication adaptor port 272. The communication adaptor 262 may be a network interface that transfers information from nodes such as nodes 302 and 304 coupled to a network as illustrated, for example, in FIG. 4. The network in which the data receiving device 250 operates may alternately be a LAN, WAN, the Internet, a public switched telephone network (PSTN) or a private telephone network, such as a Private Branch Exchange (PBX). It will be recognized that the data receiving device 250 may alternately or in addition be coupled directly to one or more other devices through one or more input/output adaptors (not shown).

The data receiving device 250 may also be coupled to one or more output devices 258 such as, for example, a speaker or a monitor and one or more input devices 260 such as, for example, a microphone, camera, keyboard, or mouse. It will be recognized, however, that the data receiving device 250 may not, for example, include a monitor or camera where only audio communication is desired.

The elements 252, 254, 256, 258, 260, and 262 of the data receiving device 250 may communicate by way of one or more communication busses 264. Those busses 264 may include, for example, a system bus, a peripheral component interface bus, and an industry standard architecture bus.

Figure 4:
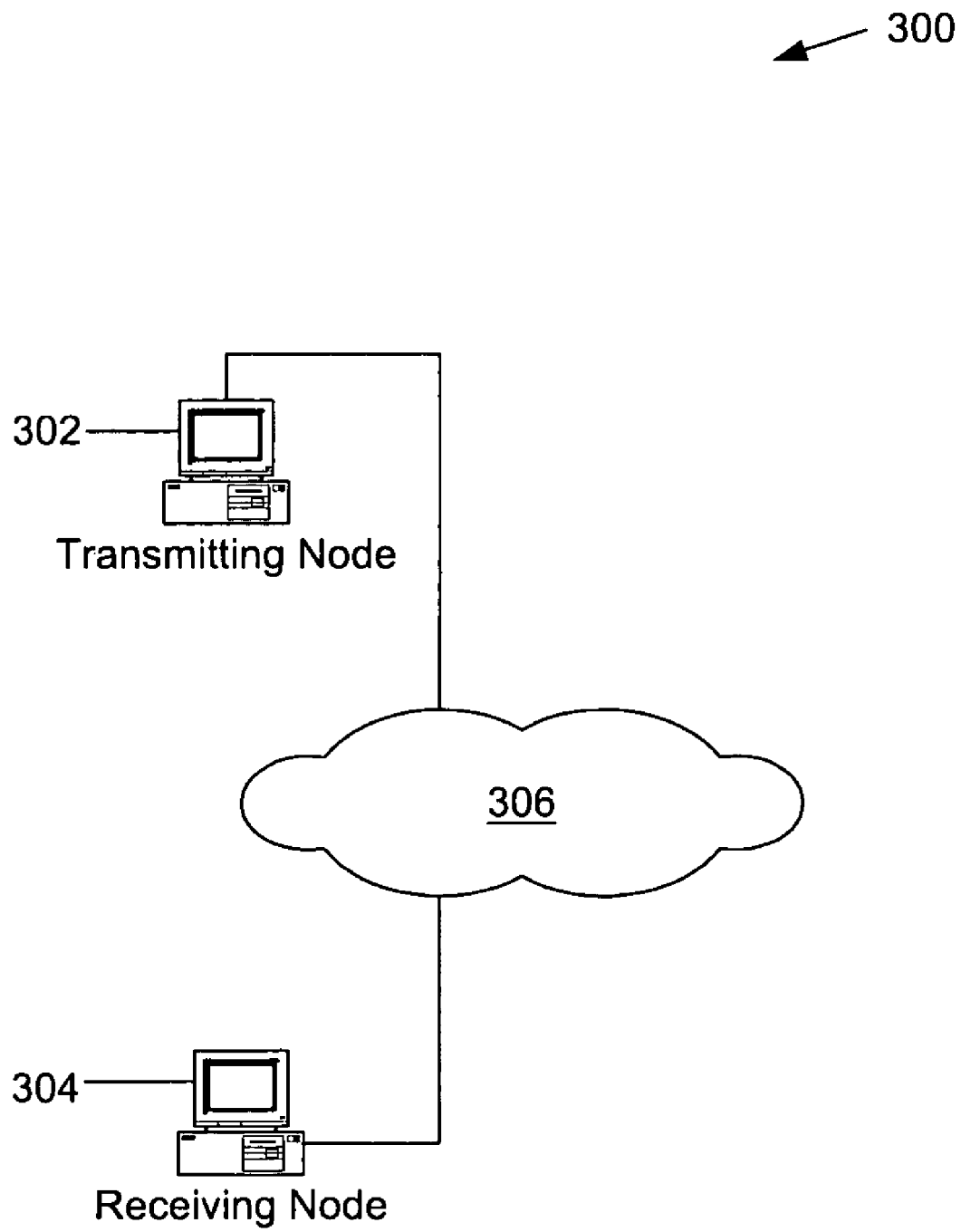
FIG. 4 illustrates an embodiment of a network in which a signal distortion may be corrected.

FIG. 4 illustrates an embodiment of a network 300 in which finding a minimum distance between a subject point and each of a plurality of points in a table, finding a table point that is closest to the subject point, and identifying an index of that closest table point, using either the L2-norm as shown in FIG. 1 or the L2-norm as shown in FIG. 2, may be performed. The network is a simplified network illustrating voice communication transmitted from a transmitting node 302 to a receiving node 304 by way of a network 306. The transmitting node 302 and the receiving node 304 may be computing devices similar to that described in connection with FIG. 3. The network 306 may be any network capable of transmitting digital information including, for example, a LAN, WAN, the Internet, a PSTN or a PBX.

In operation, an analog input such as speech from a user of the transmitting node 302 may be input to a microphone coupled to the transmitting node 302. That analog input may be converted to a digital format such as a bit-stream at the transmitting node 302. For example, a Code Excited Linear Prediction Voice Code Detector (CELP Vocoder) coupled to the transmitting node 302 may be used to convert speech to a bit-stream at the transmitting node 302. The bit-stream representing the analog input may then be transmitted over the network 306 to the receiving node 304. The receiving node 304 may be coupled to output devices that decode the received bit-stream and output it to a user of the receiving node 304. The decoder may, for example, convert the bit-stream to an analog representation of the speech transmitted by finding a minimum distance between the received bit-stream and each of a plurality of points in a pitch code book table, finding the table point that is closest to the received bit-stream, and identifying an index of that closest table point. The speech may then be output to the user of the receiving node 304 by way of, for example, a speaker.

The present distance measuring and index identification may be performed in connection with digitally transmitted audio or video signals or other information. That information may carry audio over a computer or phone network. Such networks are networks of nodes such as computers, dumb terminals, or other typically processor-based, devices interconnected by one or more forms of communication media. Typical interconnected devices range from telephones, handheld computers and notebook PCs to high-end mainframe and supercomputers. The communication media coupling those devices include twisted pair, co-axial cable, optical fibers and wireless communication techniques such as use of radio frequency.

A node may be any device coupled to the network including, for example, routers, switches, servers, and clients. Nodes may be equipped with hardware, software or firmware used to communicate information over the network in accordance with one or more protocols. A protocol may comprise a set of instructions by which the information signals are communicated over a communications medium. Protocols are, furthermore, often layered over one another to form something called a "protocol stack." In one embodiment, the network nodes operate in accordance with Internet Protocol (IP) as defined by Internet engineering Task Force (IETF) standard 5, Request for Comment (RFC) 791, (IP Specification), adopted in September, 1981 and available from www.ietf.org.

Information may comprise any data capable of being represented as a digital or analog signal, such as an electrical signal, optical signal, acoustical signal, packet, and so forth. Examples of information in this context may include digital data that represents audio or video being transmitted from one node to another, data to be utilized by the node in which the data resides, and so forth.

Audio and video communications generally involve at least two participants, at least one of which is transmitting audio and video and the other is receiving that audio and/or video. Often those two or more participants both transmit and receive audio and/or video as, for example, occurs in a typical telephone conversation. Thus, the receiving node may also act as a transmitting node and the transmitting node may act as a receiving node in a similar fashion.

While the systems, apparatuses, and methods of distance measurement and index searching have been described in detail and with reference to specific embodiments thereof, it will be apparent to one skilled in the art that various changes and modifications can be made therein without departing from the spirit and scope thereof. Thus, it is intended that the distance measurement and index searching systems, apparatuses, and methods cover modifications and variations provided they come within the scope of the appended claims and their equivalents.

What is claimed is:

1. A method, comprising:
   receiving at a receiving device, via a communication network, a bit stream representing analog information from a transmitting device, the bit stream including information associated with a first data point and a second data point;
   measuring a distance intermediate the first data point and the second data point in each of two dimensions;
   adding the absolute values of those measured distances to generate a result value; and
   outputting from the receiving device a signal based at least in part on the generated result value, wherein the output signal is associated with the analog information.

2. The method of claim 1, wherein the second data point is one of a plurality of data points in a table.

3. The method of claim 2, further comprising:
   measuring a distance intermediate the first data point and at least two of the plurality of data points in the table; and
   identifying an index corresponding to the data point in the table that is closest to the first data point.

4. The method of claim 3, wherein the index is a value for a position of a first dimension of the data point in the table closest to the first data point and an additional dimension of the data point in the table is located at a table location corresponding to the index incremented by one.

5. The method of claim 1, wherein the second data point is one of a plurality of calculated data points.

6. The method of claim 5, further comprising:
   measuring a distance intermediate the first data point and at least two of the plurality of calculated data points; and
   identifying an index corresponding to the calculated data point that is closest to the first data point.

7. The method of claim 1, wherein the first data point and second data point are found in at least three dimensions.

8. The method of claim 1, wherein the first data point represents a location in space defined by the two dimensions of the first data point and the second data point represents a location in space defined by the two dimensions of the second data point.

9. The method of claim 1, wherein the first data point is related to a location of a pixel transmitted to a node and the second data point is related to a nearest corresponding location of a pixel on a display at the node.

10. The method of claim 1, wherein the first data point is related to an audio pitch transmitted to a node and the second data point is related to a nearest corresponding audio pitch that may be played at the node.

11. The method of claim 1, further comprising:
measuring a distance intermediate the first data point and a third data point in each of two dimensions concurrently with measuring the distance intermediate the first data point and the second data point; and
adding the absolute values of the measured distances intermediate the first and third points concurrently with adding the absolute values of the measured distances intermediate the first and second points.

12. A method, comprising
receiving at a receiving device, via a communication network, a bit stream representing analog information from a transmitting device, the bit stream including information associated with a subject point and two points;
measuring distances from the subject point to the two points in a table utilizing the L1-norm, the subject point and the two points being defined in at least two dimensions;
retaining an index value for the table point measuring the least distance to the subject point; and
outputting from the receiving device a signal based at least in part on the table point referenced by the index value, wherein the output signal is associated with the analog information.

13. The method of claim 12, wherein the distance from the subject point to a first point in the table is measured separately from the distance from the subject point to a second point in the table.

14. The method of claim 12, wherein the subject point is a point that is received at a receiving node from a transmitting node and the signal corresponding to the output table point is output at the receiving node.

15. A method, comprising:
receiving at a receiving device, via a communication network, a bit stream representing analog information from a transmitting device, the bit stream including information associated with data points in a table;
adding absolute values of differences between at least two dimensions of a subject point and at least two dimensions of a first point in the table;
adding absolute values of differences between at least two dimensions of an identified point and at least two dimensions of a second point in the table;
selecting one of the first point and the second point based on the point having the smallest sum; and
outputting, from the receiving device, a signal based at least in part on the selected point, wherein the output signal is associated with the analog information.

16. The method of claim 15, wherein the subject point is a point that is received at a receiving node from a transmitting node and the signal corresponding to the selected point is output at the receiving node.

17. An apparatus, comprising:
a communication adaptor coupled to a network of remote nodes; and
a processor coupled to the communication adaptor to:
receive a bit stream representing analog information from a remote node, the bit stream including a data point, via the communication adaptor;
identify a closest point to the received data point from a plurality of points by measuring a distance intermediate the received data point and the plurality of points in each of two dimensions and adding the absolute values of those measured distances; and
output a signal based at least in part on the closest point from the plurality of points to the received data point, wherein the output signal is associated with the analog information.

18. The apparatus of claim 17, wherein the signal is output to a display.

19. The apparatus of claim 17, wherein the signal is output to a speaker.

20. The apparatus of claim 17, wherein the communication adaptor is coupled to a telephone network.

21. The device apparatus of claim 17, wherein the communication adaptor is coupled to the Internet.

22. An audio communication device, comprising:
a speaker;
a communication adaptor coupled to a network of remote nodes;
a processor coupled to the speaker and the communication adaptor to:
receive a bit stream representing analog information from a remote node, the bit stream including a data point, via the communication adaptor;
identify a closest point to the received data point from a plurality of points by measuring a distance intermediate the received data point and the plurality of points in each of two dimensions and adding the absolute values of those measured distances; and
output a signal, based at least in part on the identified closest point, to the received data point to the speaker, wherein the output signal is associated with the analog information.

23. The device of claim 22, wherein the communication adaptor is coupled to a telephone network.

24. The device of claim 22, wherein the communication adaptor is coupled to the Internet.

* * * * *